(12) United States Patent
Sakurai

(10) Patent No.: US 8,655,421 B2
(45) Date of Patent: Feb. 18, 2014

(54) PORTABLE WIRELESS DEVICE WITH EXPANDABLE MECHANISM AND WIRELESS COMMUNICATION METHOD

(75) Inventor: Masanori Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 227 days.

(21) Appl. No.: 12/743,555

(22) PCT Filed: Nov. 20, 2008

(86) PCT No.: PCT/JP2008/071158
§ 371 (c)(1),
(2), (4) Date: May 18, 2010

(87) PCT Pub. No.: WO2009/072404
PCT Pub. Date: Jun. 11, 2009

(65) Prior Publication Data
US 2010/0279749 A1    Nov. 4, 2010

(30) Foreign Application Priority Data
Dec. 3, 2007    (JP) .................................. 2007-312515

(51) Int. Cl.
*H04M 1/00*    (2006.01)

(52) U.S. Cl.
USPC ................... 455/575.4; 455/550.1; 455/575.7

(58) Field of Classification Search
None
See application file for complete search history.

(56) References Cited

U.S. PATENT DOCUMENTS

| | | | | |
|---|---|---|---|---|
| 5,438,690 A * | 8/1995 | Tsukuda | ........................ | 455/300 |
| 7,482,982 B2 * | 1/2009 | Jenwatanavet et al. | ....... | 343/702 |
| 2003/0234743 A1 | 12/2003 | Ponce De Leon et al. | | |
| 2005/0075082 A1 * | 4/2005 | Iwai et al. | ..................... | 455/90.3 |
| 2005/0237242 A1 * | 10/2005 | Kim et al. | ..................... | 343/702 |
| 2005/0239519 A1 * | 10/2005 | Saitou et al. | ............... | 455/575.1 |
| 2006/0109185 A1 * | 5/2006 | Iwai et al. | ..................... | 343/702 |
| 2008/0024893 A1 * | 1/2008 | Vanjani et al. | .................... | 360/1 |
| 2008/0146298 A1 * | 6/2008 | Kwak | ........................ | 455/575.4 |

FOREIGN PATENT DOCUMENTS

| | | |
|---|---|---|
| DE | 20 2006 013752 U1 | 11/2006 |
| DE | 20 2007 002281 U1 | 4/2007 |
| EP | 1329981 A2 | 7/2003 |
| EP | 1524822 A1 | 4/2005 |
| EP | 1594185 A1 | 11/2005 |
| JP | 2004172896 A | 6/2004 |
| JP | 2005006097 A | 1/2005 |
| JP | 2005303721 A | 10/2005 |

(Continued)

OTHER PUBLICATIONS

International Search Report for PCT/JP2008/071158 mailed Mar. 3, 2009.

(Continued)

*Primary Examiner* — Suhail Khan

(57) ABSTRACT

A portable wireless device and a wireless communication method, which can transmit and receive wireless signal without affecting influence from metallic part that is included in an expandable mechanism, are provided. In the portable wireless device taking two statuses of an expanded status in which an upper housing 2 and a lower housing 7 are arranged approximately in series and a contracted status in which the upper housing 2 and the lower housing 7 are overlapped each other, at least a part of rotating mechanism 1 which makes the expanded status and the contracted status variable is formed of metal, and the metal part of rotating mechanism 1 operates as an antenna.

7 Claims, 6 Drawing Sheets

(56) References Cited

FOREIGN PATENT DOCUMENTS

| JP | 2006067361 A | 3/2006 |
|----|--------------|--------|
| JP | 2006157283 A | 6/2006 |
| JP | 2006180170 A | 7/2006 |
| WO | 02/25769 A1 | 3/2002 |
| WO | 2007099602 A | 9/2007 |

OTHER PUBLICATIONS

Japanese Office Action for JP2007-312515 issued Sep. 13, 2011.
Supplementary European Search Report for EP 08 85 7628 issued Nov. 25, 2011.
European Office Action for EP Application No. 08 857 628.5 dated on Oct. 8, 2013.

* cited by examiner (a)

(b)

PORTABLE WIRELESS DEVICE WITH EXPANDABLE MECHANISM AND WIRELESS COMMUNICATION METHOD

TECHNICAL FIELD

A present invention relates to a portable wireless device and in particular to a portable wireless device and a wireless communication method in that a metal part of expandable mechanism functions as an antenna.

BACKGROUND ART

In recent years, portable wireless devices having various shapes have been developed. Although "fold-type" which can variably set both an expanded status and a contracted status of the device using a hinge mechanism was considered ordinary as a mainstream, an expandable-type portable wireless device using sliding mechanism or rotating mechanism also has been developed.

In the expandable-type portable wireless device, metal component is often used in the expandable mechanism (i.e. mechanism of freely set both expanded status and contracted status) for ensuring strength.

In addition, the fold-type portable wireless device using the tinge mechanism includes metal components in the hinge part for ensuring strength. So, it is supposed that "expandable mechanism" also includes a hinge mechanism in the following descriptions.

Here, in the portable wireless device with the expandable features, a location of an antenna in housings is a significant factor that influences the antenna characteristics.

As a technology in relation to the antenna of the expandable portable wireless device, a patent document 1 disclosed "A PORTABLE RADIO APPARATUS". In the invention of the patent document 1, a first chassis and a second chassis are connected at a junction part where a conductive metal is included in order to support both of opening and closing mechanism, a ground layer of the printed wiring board arranged in the respective chassis is electrically connected to another ground conductor thereof, and the ground conductor is contacted to the conductive metal.

However, in the expandable-type portable wireless device of the patent document 1, in the case that the antenna is arranged at the part which is an edge of the device in an expanded status, antenna characteristics may degrade due to affection of a human body.

A patent document 2 discloses a portable wireless apparatus equipped with an antenna element in the neighborhood of expandable mechanism (in other word, nearby a central part at expanded status). In the case that the antenna is arranged at a part which is near the center of the device in the expanded status, the deterioration in antenna characteristic caused by influence of human body of the patent document 2 can be considered smaller than that of the patent document 1.

[Patent document 1] Japanese Patent Application Laid-Open No. 2006-157283
[Patent document 2] Japanese Patent Application Laid-Open No. 2006-180170

DESCRIPTION OF INVENTION

Problem to be Solved by Invention

But, when the antenna is arranged near the expandable mechanism like the invention disclosed in the patent document 2, there is a concern of adverse influence on the antenna characteristics because metallic parts are included in the expandable mechanism.

That is, in the portable wireless device with an expandable mechanism, even if the antenna is arranged in either an edge or near the center of the device in the expanded status, the antenna characteristics might be deteriorated.

In view of the above-mentioned problems, an object of the present invention is to provide a portable wireless device and a wireless communication method which can transmit and receive wireless signal without affecting influences both of metallic components included in the expandable mechanism and human bodies.

Means for Solving the Problem

In order to achieve the above-mentioned object, a first exemplary embodiment of the present invention provides a portable wireless device that can take two statuses of an expanded status in which an upper housing and a lower housing are arranged approximately in series and a contracted status in which the upper housing and the lower housing are overlapped each other. Here, in the portable wireless device, at least a part of expandable mechanism which takes both the expanded status and the contracted status is formed of the metal, and the metal part of expandable mechanism operates as an antenna.

In addition, in order to achieve the above-mentioned object, a second exemplary embodiment of the present invention provides a wireless communication method of the portable wireless device that can take two statuses of an expanded status in which an upper housing and a lower housing are arranged approximately in series and a contracted status in which the upper housing and the lower housing are overlapped each other. The wireless communication method comprises forming at least a part of expandable mechanism, which makes variable said expanded status and said contracted status, of the metal and operating wireless communications by making a metal part of expandable mechanism operate as an antenna.

The Effect of the Invention

According to the present invention, it can provide a portable wireless device and a wireless communication method that can transmit and receive a wireless signal without affecting influences both of metal components included in an expandable mechanism and human bodies.

BEST MODE FOR CARRYING OUT INVENTION

FIG. 1 shows a general composition of a portable wireless device of a preferred example embodiment of the present invention. An upper housing 2 and a lower housing 7 of the portable wireless device are connected so that they can rotate around center of a rotating mechanism 1 that is an expandable mechanism. Here, at least a part of the rotating mechanism 1 is made of metal. That is, the rotating mechanism 1 has at least a metal component.

FIG. 2 shows a composition of the portable wireless device. The upper housing 2 includes an upper substrate 4 and a display part 3. In addition, the lower housing 7 includes a lower substrate 6. The upper substrate 4 and the lower substrate 6 are connected by a fine line coaxial 5.

However, the rotating mechanism 1 is electrically disconnected with the upper substrate 4. The electrical connection between the rotating mechanism 1 and the lower substrate 6 is performed via any one among joint parts 8-11. That is, the electric power is supplied to the metal part of the rotating mechanism 1 by using any one of the joint parts 8-11 as a feeding part, and then, the rotating mechanism 1 operates as an antenna.

The metal part of the rotating mechanism 1 operates like a Planar Inverted F Antenna by supplying electric power from any one of the joint parts 8-11 as the feeding part and by connecting at least one among remaining three of the joint parts 8-10 to GND (the ground), and then, an excellent input impedance characteristics is obtained at a predetermined bandwidth.

FIG. 3 shows a return-loss during supplying electricity to the joint 11 and grounding the joint parts 8 and 9 to GND. In FIG. 3, the return-loss of no more than 5 dB is obtained within 830 MHz-960 MHz frequency bandwidth, so it can be assured that the radio wave within the frequency band can be transmitted in the high quality.

FIG. 4 shows a return-loss during supplying electricity to the joint 11 and grounding the joint parts 9 and 10 to GND instead of the joint parts 8 and 9. In FIG. 4, the return-loss of no more than 5 dB is obtained within 830 MHz-960 MHz frequency bandwidth, so it can be also assured that the radio wave within the frequency band can be transmitted in the high quality.

FIG. 5 shows a return-loss during supplying electricity to the joint 10 instead of the joint 11 and grounding the joint parts 8 and 9 to GND as like FIG. 3. In FIG. 5, the return-loss of no more than 5 dB is obtained within 830 MHz-960 MHz frequency bandwidth, so it can be also assured that the radio wave within the frequency band can be transmitted in the high quality.

Thus, the metal part of the rotating mechanism 1 can operate as the antenna by setting the feeding part among the joint parts 8-11 and grounding whichever of the remaining joint parts. In general, excellent antenna characteristics can be often obtained by using the joint parts 8 or 10 being near the edge of the lower substrate 6 as the feeding point. However, in a real situation, the antenna characteristics is changed according to mounting status on the lower substrate 6 of the device and shapes of the metal part (i.e. shape of the metal component) of the rotating mechanism 1 or the like, so excellent antenna characteristics may be obtained by using the joint parts 9 and 11 instead of using the joint parts 8 and 10 being near the edge of the lower substrate 6 as the feeding part. Therefore, it is desirable to select the combination that can obtain the most suitable antenna characteristics according to characteristics of the substrates and the housings.

FIG. 6 shows radiation efficiency of the portable wireless device. As shown in the diagram, the best antenna characteristics can be obtained when using the joint part 10 being near the edge of the lower substrate 6 as the feeding part and grounding the joint parts 9 and 11 to GND. Furthermore, in any combinations of the feeding position and the grounding position, the radiation efficiency is almost constant for at least 830-960 MHz frequency bandwidth.

Although an electrical combination of selecting the joint part 8 as the feeding part and grounding the joint parts 9 and 11 to GND is electrically equivalent to the above-mentioned combination (i.e. selecting the joint part 10 as the feeding part and grounding the joint parts 9 and 11 to GND), the antenna characteristics is also changed when the lower substrate 6 and the lower housing 7 are asymmetric. Therefore, it is desirable to select the combination that can obtain the most suitable antenna characteristics according to the characteristics of the substrate and the housing.

Here, when the desired input impedance characteristics and the radiation characteristics are not obtained by simply connecting the joint parts 8-11 to the feeding point and GND, these characteristics can be adjusted by arranging coils and the capacitors at the joint parts 8-11 (in other word, by connecting the metal part of rotating mechanism with the feeding point and GND through coils and capacitors).

Thus, in the portable wireless device according to the exemplary embodiment, because the metal part of rotating mechanism 1 is connected with the feeding part via one of the joint parts 8-11 and with GND of the lower substrate 6 via at least one of the remaining joint parts 8 to 11 respectively, the metal part of rotating mechanism 1 and the lower substrate 6 are incorporated to function similar to the Planar Inverted F Antenna. As a result, the metal part of the rotating mechanism 1 does not influence on the radiation characteristics of the antenna, and also improves the radiation characteristics. Moreover, because the metal part of rotating mechanism 1 arranged near the central part at the expanded status operates as the antenna, antenna characteristics does not be degraded by the affection of human bodies during a communication.

In the above-mentioned embodiment, although it has described using the portable wireless device of the rotating type as an example (i.e. with a rotating mechanism as one of an expandable mechanism), even in the portable wireless device of the slide-type and the fold-type, it can also operates as the Planar Inverted F Antenna similar to the above-mentioned device by connecting the metal part of sliding mechanism and the hinge mechanism with GND of the lower substrate and the feeding point respectively by at least one position.

Further, it is to be understood that to the configurations and details of the invention of the present application, various changes can be made within the scope of the invention of the present application by those skilled in the arts.

This application is the National Phase of PCT/JP2008/ 071158, filed Nov. 20, 2008, which claims priority from Japanese Patent Application No. 2007-312515, filed on 3 Dec. 2007, the contents of which are incorporation herein by the reference in their entirety.

REFERENCE SIGNS LIST

Figure 1:
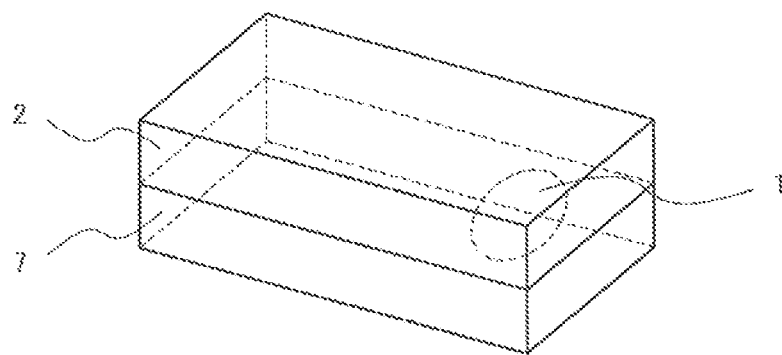
FIG. 1 is a block diagram showing a composition of main units of the portable wireless device according to the preferred embodiment of the present invention.
Figure 1:
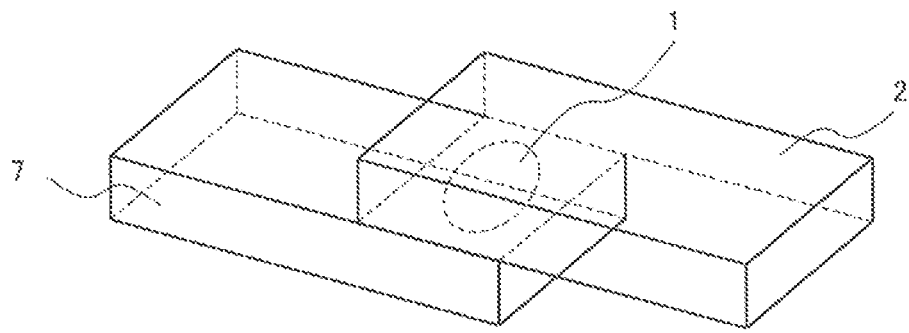
Figure 2:
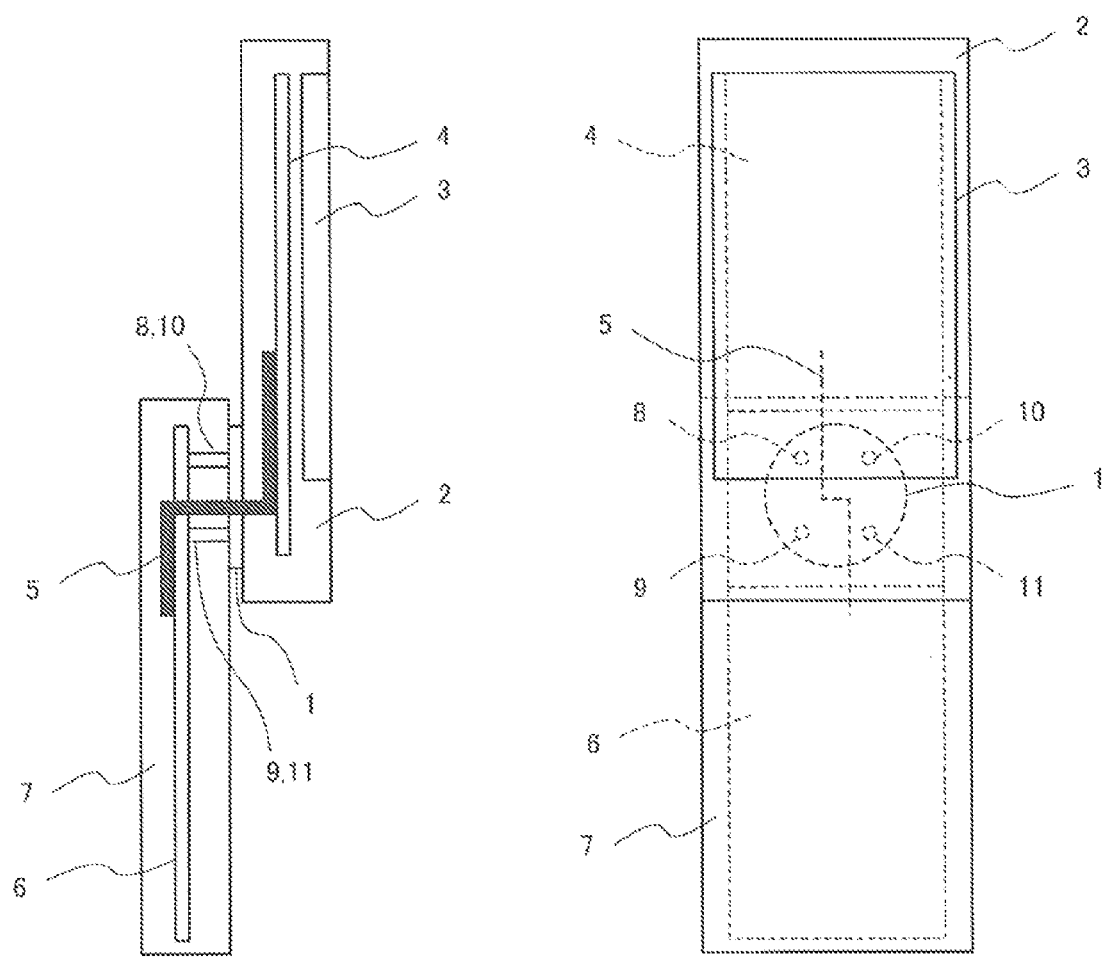
FIG. 2 is a block diagram showing a composition of the portable wireless device according to the preferred embodiment of the present invention.
Figure 3:
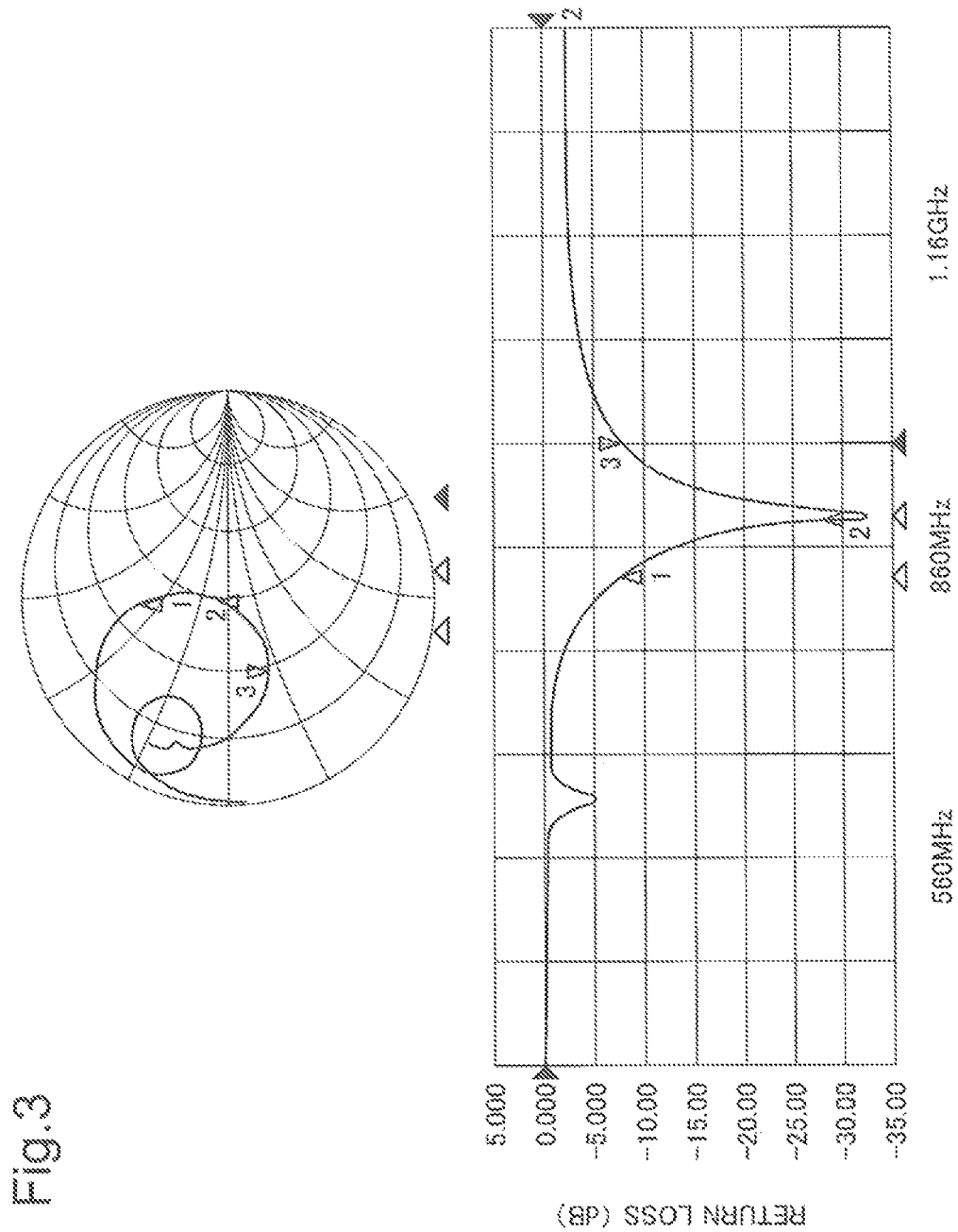
FIG. 3 is a chart showing an example of input impedance characteristics of the antenna part of the portable wireless device according to the preferred embodiment of the present invention.
Figure 4:
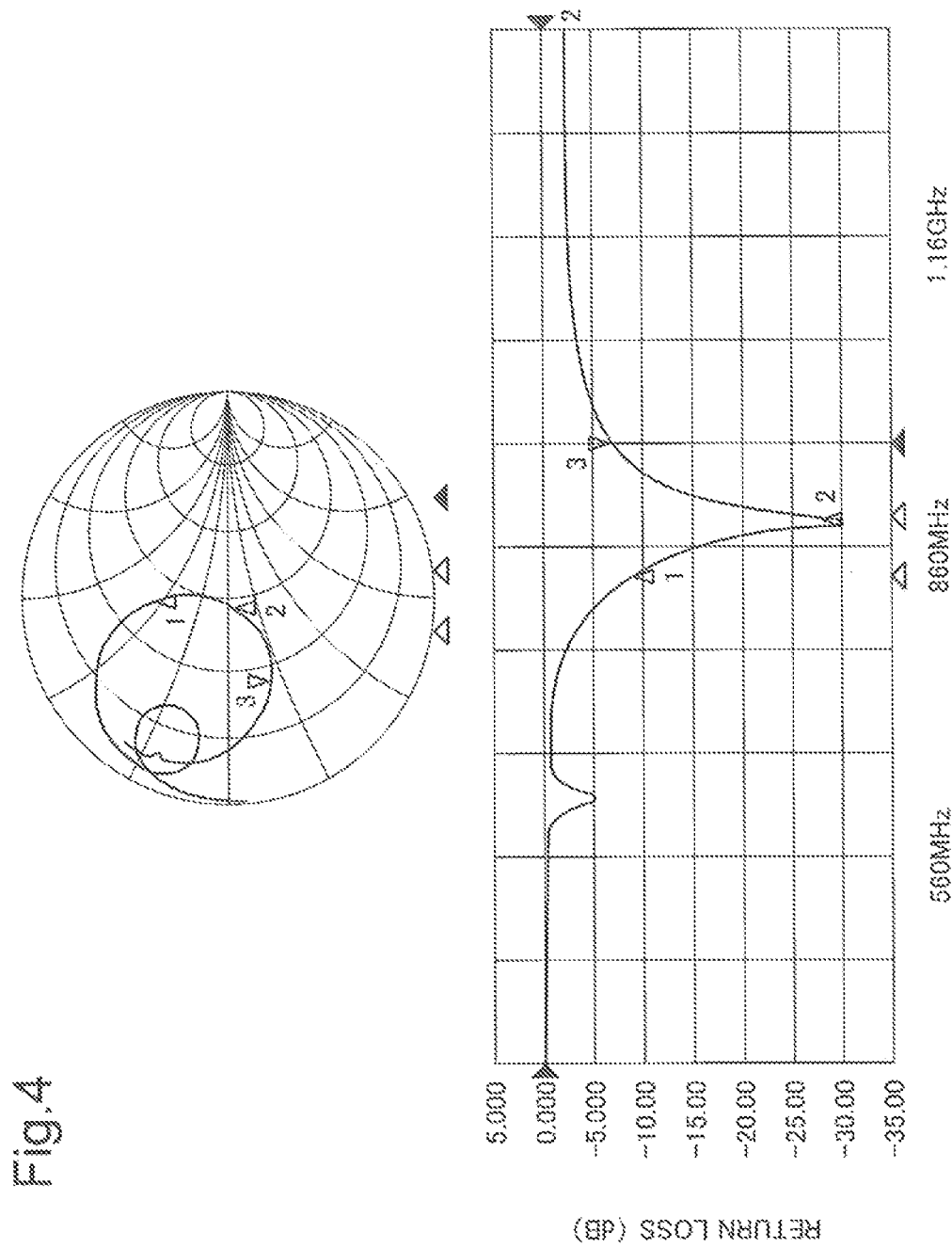
FIG. 4 is a chart showing an example of input impedance characteristics of the antenna part of the portable wireless device according to the preferred embodiment of the present invention.
Figure 5:
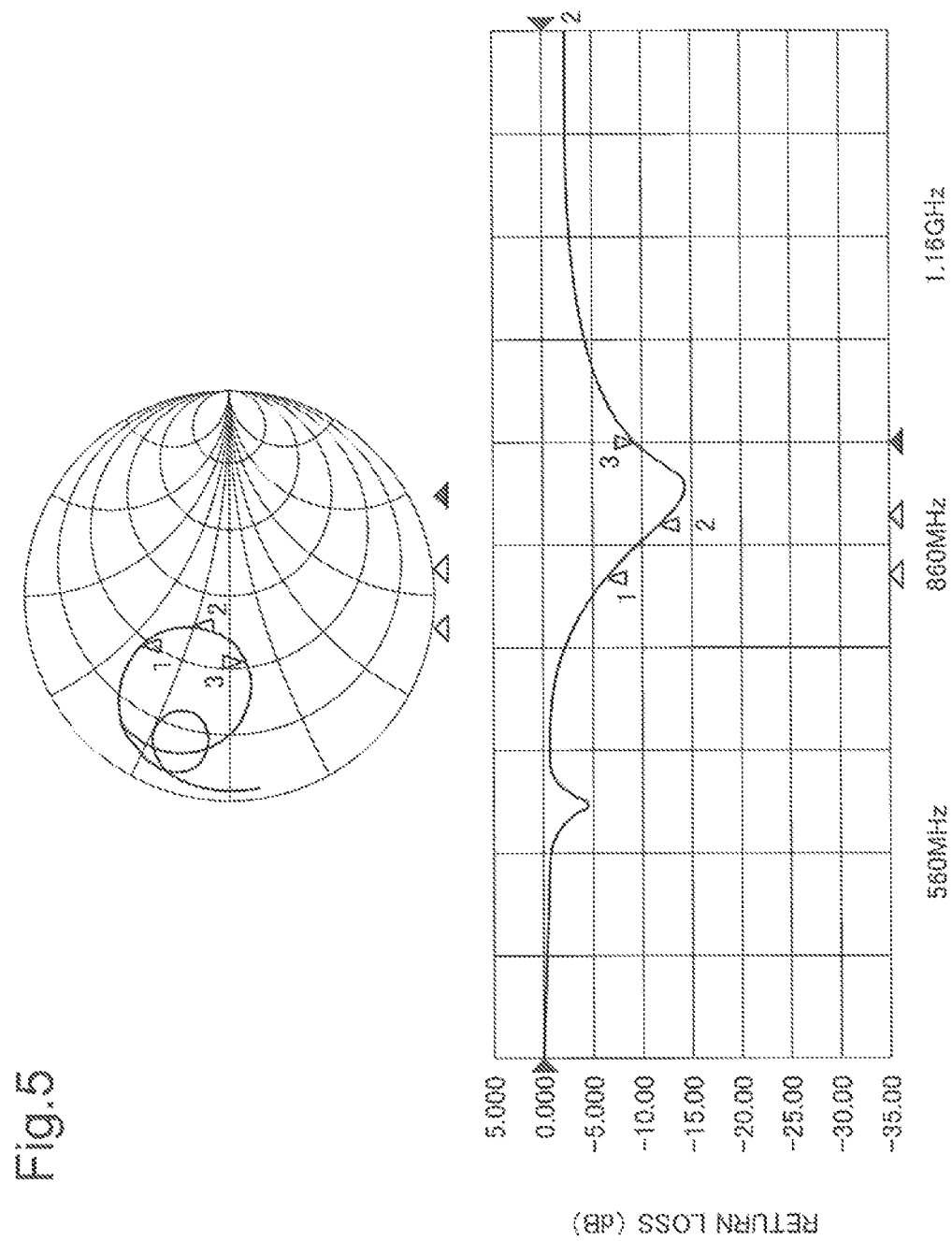
FIG. 5 is a chart showing an example of input impedance characteristics of the antenna part of the portable wireless device according to the preferred embodiment of the present invention.
Figure 6:
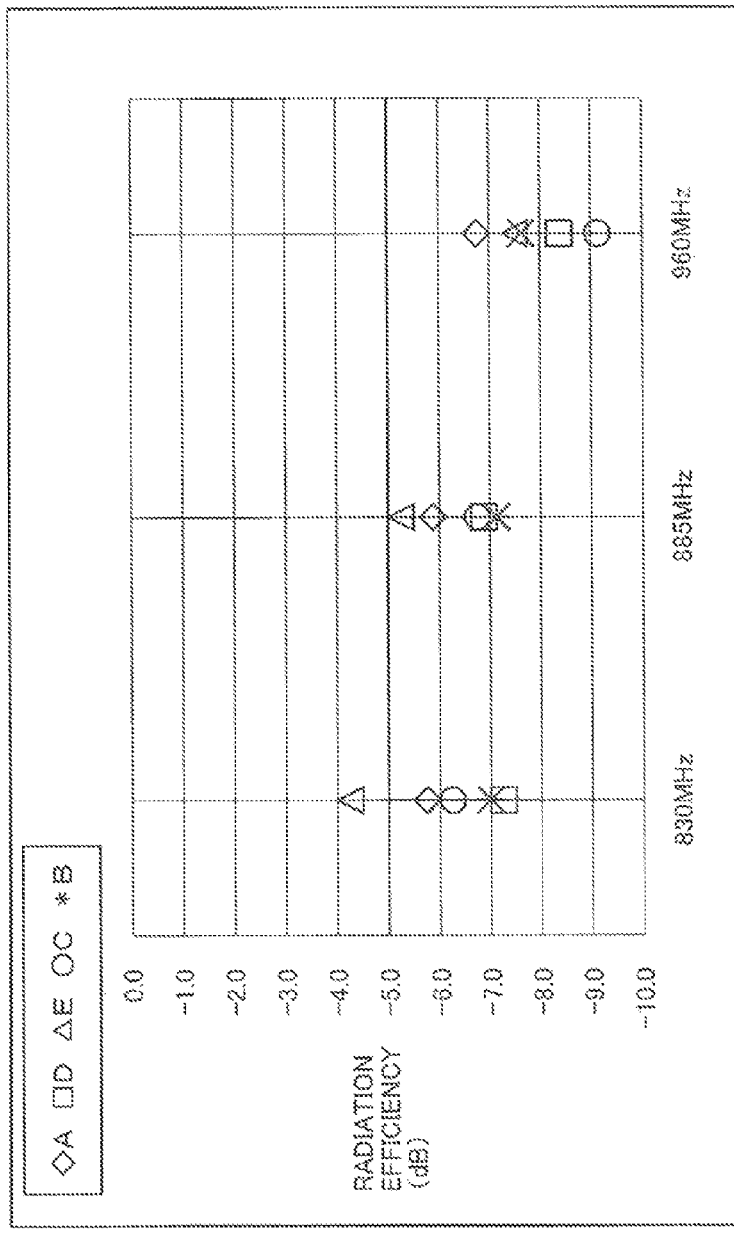
FIG. 6 is a chart showing radiation efficiency as a whole of the portable wireless device according to the preferred embodiment of the present invention.

1 Rotating mechanism
2 Upper housing

3 Display part
4 Upper substrate
5 Fine line coaxial
6 Lower substrate
7 Lower housing

The invention claimed is:

1. A portable wireless device taking two statuses of an expanded status in which a first and a second housing are located approximately in series and a contracted status in which said first and second housing overlap,
   wherein at least a part of an expandable mechanism, which makes variable said expanded status and said contracted status, is formed of metal,
   wherein a metal part of said expandable mechanism and a first substrate arranged in said first housing operate as a tabular reverse F antenna,
   wherein said expandable mechanism is electrically disconnected from a second substrate arranged in said second housing, and
   wherein said metal part operating as said tabular reverse F antenna is located at a center point between said first and second housing at said expanded status.

2. The portable wireless device according to claim 1 comprising:
   a first joint part supplying antenna current from said first substrate arranged in said first housing to said metal part of said expandable mechanism; and
   a second joint part connecting said metal part of said expandable mechanism with a ground of said first substrate.

3. The portable wireless device according to claim 2, wherein
   said first substrate and said second substrate arranged in said second housing are connected via a cable.

4. The portable wireless device according to claim 1, wherein
   said expandable mechanism is a hinge mechanism that connects said first housing with said second housing freely and rotationally so as to expose in said expanded status a face which is concealed in said contracted status.

5. The portable wireless device according to claim 1, wherein
   said expandable mechanism is a sliding mechanism that connects said first housing with said second housing so as to slide mutually.

6. The portable wireless device according to claim 1, wherein
   said expandable mechanism is a rotating mechanism that connects said first housing with said second housing freely and rotationally so as to expose in said expanded status a face of a housing which is concealed by the other housing in said contracted status.

7. A wireless communication method using a portable wireless device taking two statuses of an expanded status in which a first and a second housing are located approximately in series and a contracted status in which said first and said second housing overlap, comprising;
   forming at least a part of an expandable mechanism, which makes variable said expanded status and said contracted status, using metal,
   wherein a metal part of said expandable mechanism and a first substrate arranged in said first housing operate as a tabular reverse F antenna,
   wherein said expandable mechanism is electrically disconnected from a second substrate arranged in said second housing, and
   wherein said metal part operating as said tabular reverse F antenna is located at a center point between said first and second housing at said expanded status.

* * * * *